United States Patent
Mielenz et al.

(10) Patent No.: US 10,876,842 B2
(45) Date of Patent: Dec. 29, 2020

(54) METHOD FOR DETERMINING, WITH THE AID OF LANDMARKS, AN ATTITUDE OF A VEHICLE MOVING IN AN ENVIRONMENT IN AN AT LEAST PARTIALLY AUTOMATED MANNER

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/087,506

(22) PCT Filed: Feb. 6, 2017

(86) PCT No.: PCT/EP2017/052486
§ 371 (c)(1),
(2) Date: Sep. 21, 2018

(87) PCT Pub. No.: WO2017/174229
PCT Pub. Date: Oct. 12, 2017

(65) Prior Publication Data
US 2019/0101398 A1 Apr. 4, 2019

(30) Foreign Application Priority Data

Apr. 8, 2016 (DE) .................. 10 2016 205 870

(51) Int. Cl.
*G01C 21/32* (2006.01)
*G06T 7/73* (2017.01)
(Continued)

(52) U.S. Cl.
CPC ............. *G01C 21/32* (2013.01); *G01C 21/30* (2013.01); *G05D 1/0246* (2013.01);
(Continued)

(58) Field of Classification Search
CPC combination set(s) only.
See application file for complete search history.

(56) References Cited

U.S. PATENT DOCUMENTS

2006/0149458 A1* 7/2006 Costello ................. G06T 7/73
701/438
2013/0141565 A1 6/2013 Ling
(Continued)

FOREIGN PATENT DOCUMENTS

DE 102008057139 A1 11/2009
DE 102010042063 A1 1/2012
(Continued)

OTHER PUBLICATIONS

International Search Report for PCT/EP2017/052486, dated September 15, 2017.

*Primary Examiner* — Thomas G Black
*Assistant Examiner* — Ana D Thomas
(74) *Attorney, Agent, or Firm* — Norton Rose Fulbright US LLP; Gerard Messina

(57) ABSTRACT

A method for determining is described, with the aid of landmarks, an attitude of a vehicle moving in an environment in an at least partially automated manner; where the vehicle is moved in the environment, and through which a sequence of localization scenarios is generated; and landmark data being digitally processed by at least one vehicle control system, in order to determine the attitude of the vehicle. The quantity of landmark data is increased or decreased as needed, as a function of the localization scenarios.

9 Claims, 2 Drawing Sheets

(51) Int. Cl.
*G01C 21/30* (2006.01)
*G05D 1/02* (2020.01)

(52) U.S. Cl.
CPC ............ *G05D 1/0274* (2013.01); *G06T 7/73* (2017.01); *G05D 2201/0213* (2013.01); *G06T 2207/10016* (2013.01); *G06T 2207/30244* (2013.01); *G06T 2207/30252* (2013.01)

(56) References Cited

U.S. PATENT DOCUMENTS

| | | | | |
|---|---|---|---|---|
| 2013/0304383 | A1* | 11/2013 | Bageshwar | G01C 21/165 |
| | | | | 701/534 |
| 2017/0167883 | A1* | 6/2017 | Pink | G01C 21/30 |
| 2018/0176735 | A1* | 6/2018 | Schuller | G01C 21/20 |

FOREIGN PATENT DOCUMENTS

| | | |
|---|---|---|
| DE | 102014002821 A1 | 8/2015 |
| DE | 102014201824 A1 | 8/2015 |
| DE | 102014206901 A1 | 10/2015 |
| DE | 102015011358 A1 | 3/2016 |
| EP | 2662664 A2 | 11/2013 |
| JP | 2000338217 A | 12/2000 |
| JP | 2007147564 A | 6/2007 |
| JP | 2009264983 A | 11/2009 |
| JP | 2011511281 A | 4/2011 |
| JP | 2012159506 A | 8/2012 |
| JP | 2014066635 A | 4/2014 |

* cited by examiner

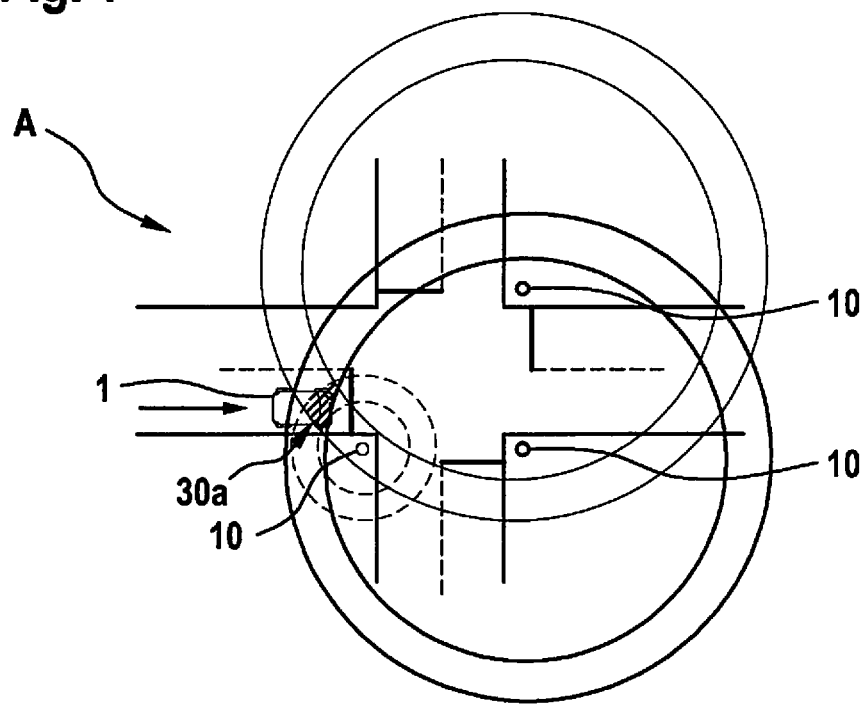
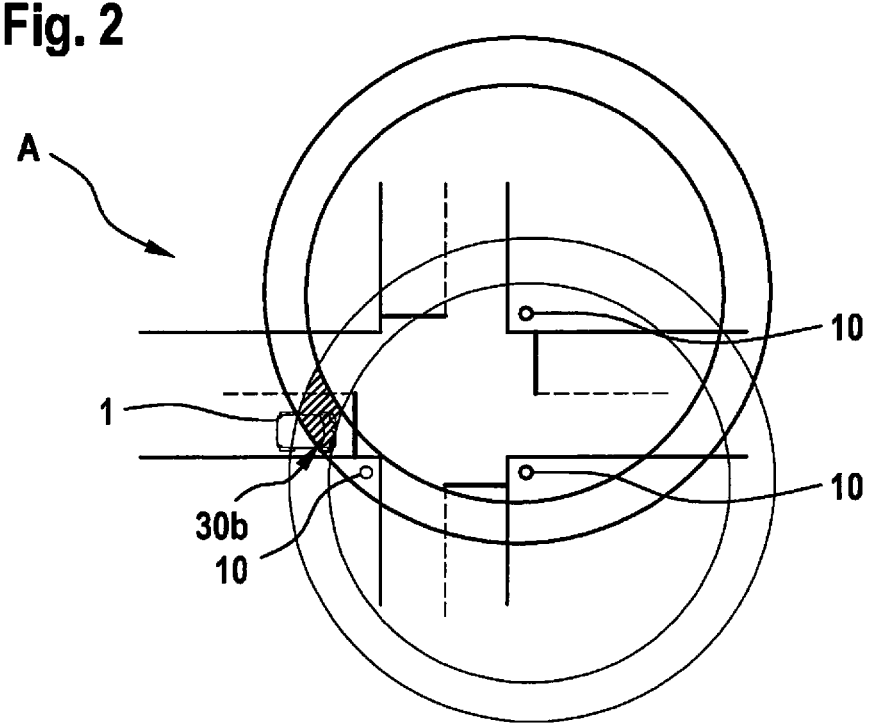

METHOD FOR DETERMINING, WITH THE AID OF LANDMARKS, AN ATTITUDE OF A VEHICLE MOVING IN AN ENVIRONMENT IN AN AT LEAST PARTIALLY AUTOMATED MANNER

FIELD OF THE INVENTION

The present invention relates to a method for determining, with the aid of landmarks, a position and orientation of a vehicle moving in an environment in an at least partially automated manner; where the vehicle is moved in the environment, and through which a sequence of localization scenarios is generated, and landmark data being digitally processed by at least one vehicle control system, in order to control the position and orientation of the vehicle.

BACKGROUND INFORMATION

In the field of engineering, attitude is understood as the spatial position of an object, namely, the position and the orientation of an object in two-dimensional space or in three-dimensional space.

In this context, the method for determining the attitude of the vehicle is additionally based on at least landmarks in the environment of the vehicle; for example, GPS data being able to constitute a basis for the attitude. In this case, attitude data of the vehicle based on GPS data may be enhanced by data, which are generated from the detection of landmarks. In particular, the orientation, for example, the direction of travel of the vehicle, may be determined as much as possible with the aid of landmarks. In this context, the accuracy of the determination of an attitude of the vehicle on the basis of landmarks is greater than the accuracy of the determination using GPS data. In the case of vehicles moving in a partially automated manner, in particular, in the case of vehicles moving in a fully automated manner in the future, pure GPS navigation is, in this context, no longer sufficient for guiding the vehicle, and systems must be used, which monitor the immediate surroundings of the vehicle and undertake the guidance of the vehicle, in particular, in view of landmarks. In this instance, the term, vehicle control system, includes essentially all of the components, which are necessary for determining the attitude, analyzing the data and, finally, controlling the vehicle.

For example, German Published Patent Application No. 10 2014 206 901 A1 describes a method for determining an attitude of a vehicle moving in an at least partially automated manner, in an environment to be traveled through or traversed. In this context, recognition of a situation is based, first of all, on monitoring of the surroundings with the aid of a surrounding area sensor system, which includes ultrasonic, laser, radar, infrared sensors, capacitive sensors, lidar sensors, and/or video image acquisition. In this case, situational recognition while the vehicle is moving in traffic is intended to be based on the detection of objects outside of the vehicle; information indicators, which indicate a particular situation, being relevant. These may be, for example, optical markings, objects or boundaries. Additionally or alternatively, further technologies for localization may be used to improve the accuracy of the situational recognition; thus, geographic data may be ascertained with the aid of a GPS system, or with the aid of digital maps including landmarks, in combination with odometry. Alternative technologies for localization accurate to within a lane include the so-called tightly coupled GNSS/INS, cooperative GNSS (global navigation satellite system) and/or triangulation methods including two reference transmitters.

German Published Patent Application No. 10 2010 042 063 A1 describes a video-based detection of landmarks, and the landmarks are coupled with GPS or Galileo data for both rough and also more accurate, fine position determination of the vehicle. For this, the position determination device is configured to carry out ego localization on the basis of the position of the vehicle and, additionally or alternatively, in a landmark-based manner. Finally, vehicle control systems are provided to control the vehicle, and in the vehicle control system, the data regarding the landmarks are processed digitally in order to determine the attitude of the vehicle.

In particular, metric maps are often used for the localization of a highly automated vehicle in an urban environment. These allow highly precise localization as a function of the level of detail and accuracy of the environmental information included in it. Approaches for this include substantially uniform, scenario-dependent localization determinations, in particular, via landmarks. In this context, approaches are known, which allow an average uniform localization accuracy of, for example, approximately 0.1 m. The accuracy of 0.1 m is sufficient for highly automated driving in the urban environment. However, depending on the scenario that occurs for the localization, which is referred to in the following as the localization scenario, a markedly inaccurate localization may be sufficient. Consequently, data for processing in the vehicle control system are generated, which are unnecessary for reliably guiding a vehicle moving in an at least partially automated manner. In particular, if data must also still be exchanged with a back end via the vehicle control system, quantities of data are generated, which load the system unnecessarily and tie down a data storage unit of the system excessively with regard to available resources.

In order to use the necessary resources efficiently with regard to computing expenditure and data storage, approaches are known which allow a minimal amount of data to be used for generating a map of the surroundings and the subsequent localization in this map. In this context, the computational expenditure of such an algorithm is related quadratically to the number of landmarks included in the map. As such, a reduction in the number of landmarks would allow a considerable reduction in the required computing capacity.

In addition, so-called offline algorithms for selecting the position of artificial landmarks are known. Due to the high computational complexity of such an approach, this is not suited for landmark selection for the running time in the vehicle. For this, in contrast with the necessity for a vehicle moving in a partially automated manner, the forthcoming trajectory of the vehicle is additionally necessary and assumed to be known, which means that, for example, a vehicle having variable destinations may not be guided spontaneously, using such an approach.

SUMMARY

The object of the present invention is to further refine a method for determining an attitude of at least one vehicle moving in a partially automated manner; the method being intended to be designed in such a manner, that the necessary computing power and the quantity of data to be processed are reduced. In this context, the vehicle moving in a partially automated manner should continue to be able to be guided in a safe manner.

Starting out from a method, and starting out from a vehicle control system, this object is achieved by the respective characterizing features.

The present invention incorporates the technical teaching, that the quantity of landmark data is increased or decreased as needed, as a function of the localization scenarios.

The advantage of the present invention is an, on the whole, lower quantity of data arising for determining an attitude of a vehicle moving in an at least partially automated manner; the quantity of data generated for processing in the vehicle control system being reduced. In addition, a quantity of data to be transmitted, which is exchanged, for example, with a back end server, is reduced.

A result of the need-based adaptation of the acquired quantity of landmark data, as a function of the localization scenarios, is that an increased quantity of landmark data is generated due to a greater level of detail for the determination of the attitude, and that a decreased quantity of landmark data is generated due to a lower level of detail for the determination of the attitude. Also, a result of the method of the present invention is that in the event of an increased quantity of landmark data, a greater number of landmarks are processed for the determination of the attitude, and that in the event of a decreased quantity of landmark data, a smaller number of landmarks are processed for the determination of the attitude.

The reduction in the landmark data may be achieved, for example, in that landmarks, which, on the whole, allow an adequate determination of the attitude of the vehicle, using a minimal number, are selected from a quantity of available landmarks, in order to determine the attitude.

A data storage unit, in particular, in the form of a component of the vehicle control system, is provided in a further advantageous manner; only the need-based quantity of the landmark data being stored in the data storage unit and/or retrieved from the data storage unit as a function of the localization scenario.

For example, a two-dimensional map, which is of the surrounding area to be driven through, and in which information about landmarks is present, may be provided, in particular, with the aid of the data storage unit; the map being subdivided into regions, which represent specific localization scenarios. Landmarks may include, for example, traffic signs, traffic lights, lamp posts, curbs or road markings. Further landmarks include objects in the surrounding area, such as houses; in general, landmarks being selected from immobile objects.

The map is subdivided into regions, which convey the context of the scene, so that for example, the scene context, "intersection without road markings," may be extracted from the data storage unit. In this manner, the scene context may be retrieved by the highly automated vehicle system, using an approximate, GPS-based, global attitude.

In a further advantageous manner, the method provides that an odometric error model and/or a generic form be activated, in particular, for ascertaining an odometric offset at the start of an automated trip by the vehicle moving in a partially automated manner. In other words, upon activation of an odometric error model or a corresponding generic form, the vehicle may be started with the start of the highly automated vehicle system for ascertaining the odometric offset, and at an appropriate time, the data analysis regarding the landmarks is added, if a corresponding accumulation of errors has occurred. In this context, the orienting of the vehicle on the basis of landmarks is used for correcting the influence of inaccuracy, in order to render a highly automated trip of the vehicle possible, in particular, in the urban environment.

A triangulation method between a plurality of landmarks is used in a further advantageous manner, which means that a low number of landmarks to be detected and processed is sufficient.

In order to start the guidance system for guiding the vehicle, it is provided that at the beginning, the localization accuracy be set to an accuracy, which may be attained due to the landmarks observable from the position, in view of the on-board sensor system. The localization accuracy is determined on the basis of a statistical method. If no landmarks are visible at the start of the system, either the positioning last determined at the corresponding localization accuracy may be selected, or GPS coordinates are used as a rough estimate of position. Beginning at the starting point of the trip, the error propagation with regard to the localization accuracy develops, as the errors, which result from the use of the odometric error model, are added to the uncertainty at the beginning. If the total error reaches a particular threshold value, which is a function of the scenario currently run through, then landmarks of a certain distribution and number are searched for by the on-board sensor system. In this case, the present invention provides that only as many landmarks be searched for, as are necessary as a function of the localization scenario. Consequently, the number and the distribution of the landmarks are a function of the localization accuracy to be attained and are selected accordingly by the method of the present invention. The quantity of possible landmarks and their position relative to the vehicle are known from the map, which is loaded from the data storage unit. The detected landmarks are recorded with the landmarks from the map with the aid of a matching algorithm. The localization accuracy is repeatedly checked by the above-mentioned algorithm, and the odometric error is reset. In particular, landmarks are selected, which are situated so as to be distributed around the vehicle as much as possible. Consequently, a comparatively high localization accuracy is attainable with the aid of an already low number of landmarks, using, in particular, the triangulation method.

The present invention is further directed toward a vehicle control system for implementing the method for determining, with the aid of landmarks, the attitude of a vehicle moving in an environment in an at least partially automated manner; the vehicle being movable in the environment, and a sequence of localization scenarios being generated, and the landmark data for determining the attitude of the vehicle being digitally processible with the aid of the vehicle control system. In this context, the present invention provides that the vehicle control system be configured in such a manner, that the length of the landmark data is increased or decreased as needed, as a function of the localization scenarios. The further features and associated advantages of the method of the present invention are correspondingly applicable to the vehicle control system.

BRIEF DESCRIPTION OF THE DRAWINGS

FIG. 1 shows a localization scenario of a vehicle at an intersection, three landmarks being detected.

FIG. 2 shows the localization scenario according to FIG. 1, only two landmarks being detected.

DETAILED DESCRIPTION

FIGS. 1 and 2 show an example of a localization scenario for determining an attitude of a vehicle 1 in an environment, with the aid of landmarks 10; the vehicle moving in a partially automated manner. Localization scenario A depicts vehicle 1 at an intersection, and by way of example, three landmarks 10 are shown, of which all of the landmarks 10 are detected. In this case, the influence of measuring errors on the localization accuracy is improved by triangulation. If only two landmarks 10 are detected, as represented in FIG. 2, then an attitude accuracy 30b is obtained, which is less than localization accuracy 30a according to FIG. 1, in which three landmarks 10 are detected. In addition, the limitation to attitude accuracy 30a is obtained by triangulation. This also reduces the risk of all landmarks 10 being masked by other road users. In addition, the example of FIGS. 1 and 2 shows that the influence of measuring errors on the localization accuracy is improved by triangulation, and there is a decreased risk of masking of all landmarks 10 by other road users, for example, by a cargo truck in an adjacent traffic lane.

Figure 3:
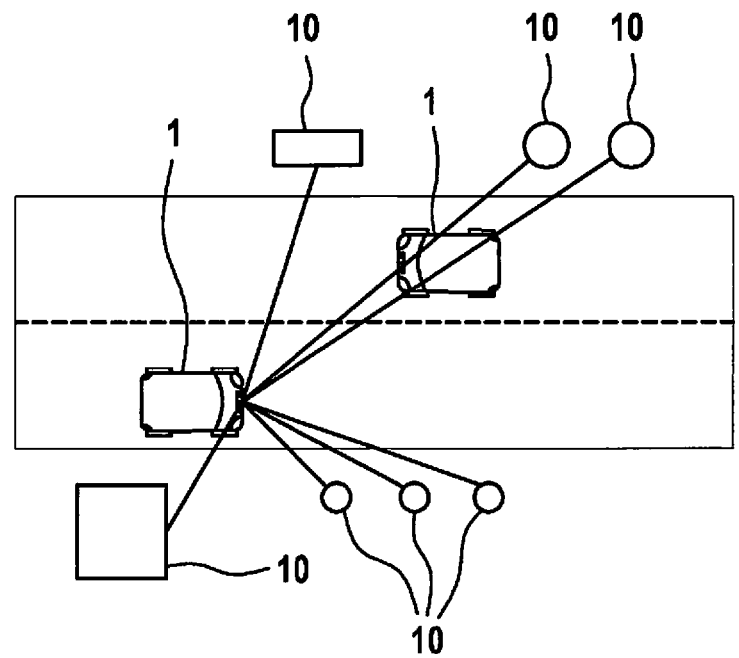
FIG. 3 shows a localization scenario in road traffic, including concealed landmarks.

To this end, FIG. 3 shows an example of a vehicle 1, which a further vehicle 1 is approaching. Two landmarks 10 are concealed by it, and due to the detection of further landmarks 10 that is spread out as much as possible, sufficient localization may be obtained in spite of the masking of the two landmarks 10 by further vehicle 1.

As a rule, at or above a quantity of 10 landmarks, no significant improvement in the localization accuracy occurs anymore by using even more landmarks 10. As depicted above, the computational expenditure for solving the localization problem is a strong function of the number of landmarks. Based on these circumstances, then, in view of a reduction in the computational expenditure, the number of landmarks 10 per period of time should be used for localization, therefore, as a function of the localization scenario, even in the case of the most stringent requirements for localization accuracy. In scenarios having less stringent requirements for localization accuracy, the number may be selected to be correspondingly lower. In view of possible instances of error detection and masking, slightly more landmarks 10 are used than are theoretically necessary.

Figure 4:
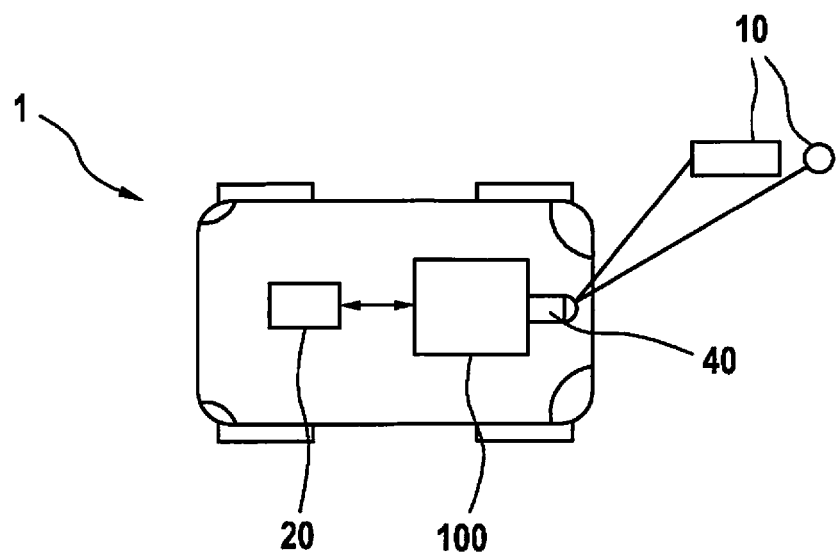
FIG. 4 shows a schematic view of a vehicle having a vehicle control system of the present invention.

FIG. 4 shows, by way of example, a vehicle 1 including a vehicle control system 100, which has a data storage unit 20 and a landmark sensor 40. In this context, landmark sensor 40 is used for detecting landmarks 10 and takes the form, for example, of a radar scanner, a lidar scanner or the like.

In its implementation, the present invention is not limited to the preferred exemplary embodiment indicated above. On the contrary, a number of variants are conceivable, which also make use of the represented design approach in fundamentally different implementations. All of the features and/or advantages derived from the claims, the description or the drawing, including structural details, spatial layouts and method steps, may be part of the present invention, both alone and in many different combinations.

What is claimed is:

1. A method for determining, with at least one landmark and in an at least partially automated manner, an attitude of a vehicle moving in an environment, the method comprising:

activating at least one of an odometric error model and a generic form for ascertaining an odometric offset at a start of an automated trip by the vehicle moving in the partially automated manner;

moving, via a vehicle control system, the vehicle in the environment;

generating, by the moving of the vehicle, a sequence of localization scenarios, wherein a digital map the localization scenarios;

digitally processing landmark data by at least one vehicle control system to determine the attitude of the vehicle;

one of increasing and decreasing a quantity of landmark data as a function of the localization scenarios; and at least one of storing in a data storage unit and retrieving from the data storage unit only a need-based quantity of the landmark data as a function of the localization scenarios;

wherein a digital map of the area, in which the vehicle is to be moved, is subdivided into regions that represent specific localization scenarios, wherein a triangulation method between a plurality of landmarks is used, and wherein a quantity of the landmark data is proportional to a level of detail for the determining of the attitude, and/or wherein a quantity of the landmark data is proportional to a number of landmarks processed for the determining of the attitude.

2. The method as recited in claim 1, wherein the quantity of the landmark data is proportional to the level of detail for the determining of the attitude.

3. The method as recited in claim 1, wherein the quantity of the landmark data is proportional to the number of landmarks processed for the determining of the attitude.

4. The method as recited in claim 1, wherein the at least one landmarks allows a determination of the attitude of the vehicle using a minimal number, and wherein a quantity of the at least one landmark is selected from a quantity of available landmarks to determine the attitude.

5. The method as recited in claim 1, further comprising:
providing the digital map, which is an at least 2-dimensional map, wherein the at least 2-dimensional map is of a surrounding area to be driven through, information about the at least one landmark is present in the at least 2-dimensional map, is provided, and wherein the at least 2-dimensional map is subdivided into the regions that represent the specific localization scenarios.

6. The method as recited in claim 5, wherein the at least 2-dimensional map is provided with a data storage unit.

7. The method as recited in claim 1, wherein the triangulation method between the plurality of landmarks is used to lower a number of landmarks to be detected and processed.

8. The method as recited in claim 1, wherein landmarks are selected that are distributed around the vehicle.

9. A vehicle control system for determining, with at least one landmark and in an at least partially automated manner, an attitude of a vehicle moving in an environment, comprising:

a vehicle control system for moving the vehicle in the environment;

an arrangement for generating, through the moving of the vehicle, a sequence of localization scenarios;

an arrangement for digitally processing landmark data by the at least one vehicle control system to determine the attitude of the vehicle; and an arrangement for one of increasing and decreasing a quantity of landmark data as a function of the localization scenarios;

wherein a digital map of the area, in which the vehicle is to be moved, is subdivided into regions that represent specific localization scenarios, wherein a triangulation method between a plurality of landmarks is used, wherein only a need-based quantity of the landmark data as a function of the localization scenarios is at least one of stored in a data storage unit and retrieved from the data storage unit, and wherein a quantity of the landmark data is proportional to a level of detail for the determining of the attitude, and/or wherein a quantity of the landmark data is proportional to a number of landmarks processed for the determining of the attitude, and wherein there is an activation of at least one of an odometric error model and a generic form for ascertaining an odometric offset at a start of an automated trip by the vehicle moving in the partially automated manner.

* * * * *